Oct. 7, 1941.   W. MOSSBACK ET AL   2,258,027
TIRE GROOVER
Filed May 27, 1940
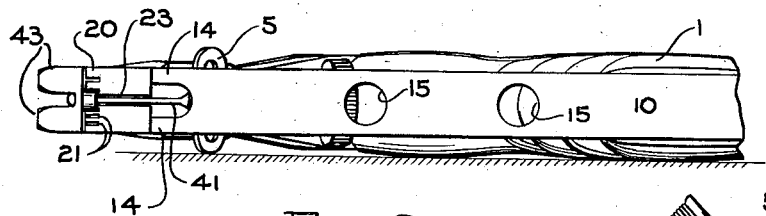
Fig. 2
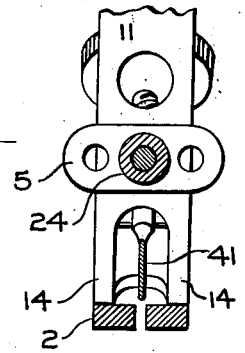
Fig. 5
Fig. 1
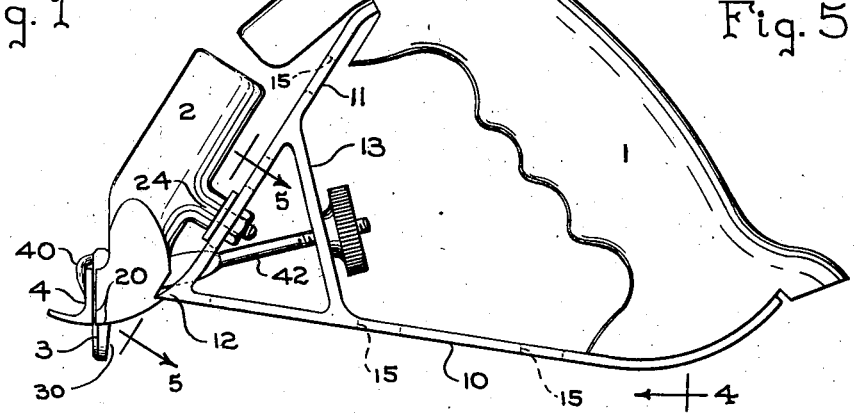
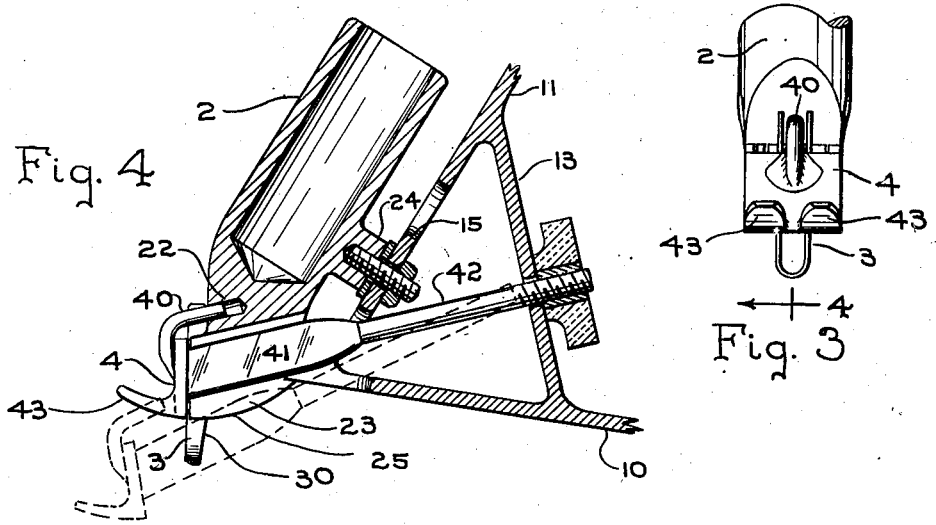
Fig. 4
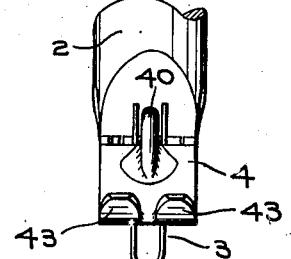
Fig. 3
William Mossback  Inventors
Joseph A. Menard
By Reynolds & Beach
Attorneys Patented Oct. 7, 1941

2,258,027

UNITED STATES PATENT OFFICE 2,258,027

TIRE GROOVER

William Mossback and Joseph A. Menard, Seattle, Wash., assignors to Timesaver Products Company, Seattle, Wash., a corporation of Washington Application May 27, 1940, Serial No. 337,448

9 Claims. (Cl. 30—140)

Our invention relates to tools for grooving automobile tire casings, and constitutes an improvement upon the structure disclosed in Mossback Patent No. 2,140,478, issued December 13, 1938.

After automobile tires have become worn somewhat the tread grooves become shallow, and sometimes the tire is worn sufficiently so that no grooves are left, although there is still considerable rubber over the fabric. In order to obtain the maximum wear from a tire, while at the same time maintaining a grooved surface which will increase traction and reduce the tendency of the car to skid, new grooves or deeper grooves are often cut in the tire tread. It has been found that such grooves are cut most satisfactorily by a tool operating at a high temperature.

The desirability of employing a heated tool was pointed out in the Mossback patent referred to above, but it was found in practice that when the tool of that device was heated to a sufficiently high temperature the frame also became very hot, so that it was difficult for the workman holding the tool to avoid burning his hands when accidentally or necessarily touching the frame. Moreover, it was difficult to heat the cutter to a sufficiently high temperature by conduction from the heating element through the structure employed. At operating temperature the tool could not be laid down except on a heat-resistant surface, for otherwise the surface would be burned by contact with the heating element.

Our present tool has eliminated these difficulties by forming the cutter holder as an integral part of the support for the heating element, which support is in intimate heat-exchange relation with the heating element, and which, with the integral holder, has sufficient body that the heat is readily conducted to the cutter. The cutter is held in place by a simplified structure including a plate pressing it against the heating element holder. A flat blade integral with such plate is received in a slot in the holder, and has a shank provided with a screw for drawing the plate against the cutter. This plate has forwardly extending guide fingers which assist in positioning the tool with respect to the tire, and which are spaced apart to afford to the operator a view of the work. A locating pin carried by the cutter clamping plate and seating in a socket in the holder insures accurate and quick location of the plate.

The frame is apertured at intervals so that heat will not be readily conducted along it, and minimum opportunity for conduction of heat from the heating element's support to the frame is afforded by contact only at the frame tip, and at a point spaced therefrom. A leg on the support holds it elevated from the surface on which the tool rests when the operator lays it down. Tapering the cutter decreases its resistance to movement through the rubber and increases its temperature.

A principal object of our invention is therefore to provide a tool which will maintain a uniformly high temperature without resulting in the tool frame being heated unduly.

It is a further object to provide such mechanism which will have simplified cutter holding mechanism, which is easy and convenient to operate, which is of simple construction and yet which will hold the cutter firmly and accurately in place. It is also desired that such cutter holding mechanism act as a guide for the cutter, yet that it enable the operator to view the cutting action of the cutter.

Another object is to enable the tool to be laid down while at operating temperature without damage to the surface on which it is laid, even though such surface be not of metal or similarly heat-resistant.

It is an additional object to provide a cutter which will have maximum cutting efficiency by being maintained at a high temperature, and which will have minimum resistance in passing through the rubber which it cuts.

Other objects of the invention inherent in the construction described in detail hereafter will be understood from a study of the description thereof.

Our improved device shown in the drawing demonstrates how the above objects may be accomplished, but it is to be understood that various modifications may be made in details of our device without departing from its novel characteristics as defined in the appended claims.

Figure 1 is a side elevation view of our device.

Figure 2 is a bottom plan view of the tool, showing parts broken away.

Figure 3 is a front elevation view of a portion of the tool.

Figure 4 is a sectional view through a portion of our tool, taken along the line 4—4 of Figure 3.

Figure 5 is a further sectional view, taken along the line 5—5 of Figure 1.

The tool consists of a generally triangular frame, one side of which is formed by the handle 1, the other two sides 10 and 11 being straps or bars joined at the apex 12. Between the sides 10 and 11, and bridging the apex 12, extends a brace bar 13.

The support 2, socketed to receive an electric heating element (not shown), constitutes a heated body which extends generally parallel to the side 11 of the triangular frame, and is formed at its lower end into a cutter blade carrier 20, provided with slots 21 spaced at different intervals to receive therein cutters of different widths. The cutter itself, indicated at 3, is U-shaped. Its front edge is ground to provide a cutting edge, while its rear portion 30 is inclined forwardly and downwardly to provide a tapered conformation. Because the cutter is supported in a cantilever manner no strength is sacrificed, yet because of the smaller mass of the portion of the cutter projecting farther from the holder, a higher and more uniform temperature can be maintained, and the cutter, having a smaller surface, will be less resistant to movement through the rubber of the tire being grooved.

In order to hold the cutter securely and accurately in the slots 21, a plate 4 having a plane rear surface is provided to press rearwardly against the front edge of the cutter which projects slightly out of the slots. It will be noted that this plate is not grooved, but has a plane rear surface. Accurate positioning of the plate is assured by a pin 40 which extends into a socket or hole 22 formed in the lower end of the heating element support 2. A tensioning member is rear surface is provided to press rearwardly from plate 4, including a thin, flat blade portion 41 which is received in a slot 23 extending upwardly into the lower end of the support 2. Integral with the rearward end of the blade 41 is formed a shank 42, which in operative position of plate 4 extends through a hole in the brace 13. A knurled knob threaded onto the end of rod 42 and bearing against the brace may be rotated to draw the plate 4 securely against the cutter 3 and thus hold it firmly in operative position. As shown in broken lines in Figure 4, this blade-retaining plate and tensioning structure may be slid forward and dropped down out of slot 23 so that it may be removed as a unit from the tool, thus affording complete access to the grooves 21 in which cutter 3 seats.

The support or heated body 2 is supported upon the tool frame, and is positioned with respect to the frame by three-point engagement. The frame apex 12 is bifurcated as shown in Figure 2, each finger 14 being brought to a knife edge and engaging a notch in the base of the heating element. The third point of engagement with the frame is provided by a boss 24 extending rearwardly from the body 2, and connected to the side 11 of the frame by a bolt, for example. It will thus be seen that there is minimum opportunity for heat to be conducted from the heated body to the frame. Moreover, holes 15 are provided in the frame which impede conduction of heat along the sides 10 and 11.

In operation a suitable heating element, preferably electric, is received in the support 2. As this body is heated by such element the cutter holder 20 and cutter 3 are heated, but the frame remains comparatively cool. The cutter is held firmly in place by pressure of plate 4 against its front edge. The downward projection of the cutter may, of course, be varied by slackening the pressure of the plate 4 thereon, and then adjusting the cutter vertically, after which the plate will again be brought into clamping position. As the cutter and tire casing are moved relatively, the tool rides on the lower curved surface 25 of the heated body 2 and the cooperating forwardly extending fingers 43 integral with plate 4, to guide the cutter along the work. The fingers 43 are spaced apart to leave an observation notch through which the operator may watch the action of the cutter, so that he may manipulate the tool to obtain the desired operation.

A supporting bar 5 may be secured between the frame member 11 and the heating element 2. This extends laterally, preferably both sides of strap 11, sufficiently far to constitute with the handle a strut or lug to keep the heated body 2 elevated from a supporting surface when the tool is laid down, as shown in Figure 2. If this bar is of metal, holes may be provided in it to reduce its heat-conducting characteristics, or the bar itself may be of material which does not readily conduct heat. In the latter case the bar will serve further to retard conduction of heat from the heated body to the frame.

What we claim as our invention is:

1. A tire grooving tool, comprising a handle and two angularly disposed frame members defining a generally triangular frame, a heated body disposed generally parallel to one of said frame members and engaging the apex of said frame opposite said handle, means interposed between said heated body and the member of said frame parallel thereto, supporting said heated body from such frame member in a position spaced therefrom, and a cutter carried by said heated body.

2. A tire grooving tool, comprising a frame, and a U-shaped cutter supported from said frame and having its curved portion disposed considerably below said frame, the downward projecting portion of said cutter having its forward edge sharpened and its rearward edge inclined forwardly and downwardly toward its sharpened edge, thereby being tapered in width.

3. A tire grooving tool, comprising a handle and two frame members defining a generally triangular frame, a heated body supported from said frame at the apex opposite said handle, and a supporting member adjacent to such frame apex extending transversely of said frame outward beyond said heated body, to constitute with said handle a support for maintaining said heated body spaced from a surface contacted by said handle and by said supporting member.

4. A tire grooving tool, comprising a frame, a generally upright heated body secured upon the front of said frame and having slots in the forward side of its lower end, a U-shaped cutter engaged in said slots of a width greater than the depth of such slots, a plate engaging the forward edge of said cutter protruding from such slots, said heated body having a slot extending upward from the lower end thereof, and disposed in a plane generally parallel to said frame, a blade element integral with and extending rearwardly from said plate, and received in said upwardly extending heated body's slot, and means reacting between said blade element and said frame for drawing said plate rearwardly against the cutter to clamp the cutter to said heated body.

5. A tire grooving tool, comprising a generally triangular frame, a generally upright heated body carried thereby substantially parallel to one side of said frame, and having slots in the front side of its lower end, a U-shaped cutter seated in said slots and projecting outwardly beyond the slots, a plate adapted to seat against the projecting edge of said cutter, a rearwardly projecting pin carried by said plate, said heated body having a socket for receiving the end of said pin to locate said plate, and means reacting between said plate and said frame to draw said pin into its socket and said plate into holding engagement with the cutter.

6. A tire grooving tool, comprising a handle and two angularly disposed frame members defining a generally triangular frame, a generally upright heated body supported from said frame and engaging the apex thereof opposite said handle, said angularly disposed frame members being bifurcated at their junction to define an apex notched generally in the plane of said frame, said heated body being slotted upwardly from its lower end generally parallel to the plane of the frame, a cutter supported from said frame, a plate adapted to clamp said cutter, and mechanism for moving said plate into clamping engagement with said cutter including a thin blade received in said heated body's slot and said frame apex notch, and means interconnecting said blade and said frame for moving the blade into cutter clamping position.

7. A tire grooving tool, comprising a handle and two angularly disposed frame members defining a generally triangular frame, a heated body disposed generally parallel to one of said frame members and supported from said frame, and said heated body having a curved end disposed adjacent to the other frame member, a cutter carried by said heated body, a plate clamping said cutter to said heated body, and spaced fingers integral with and extending forwardly from said plate generally in continuation of the curved end of said heated body, constituting with said such body's surface a guide for the tool.

8. A tire grooving tool, comprising a handle, a generally upright frame member, and a generally horizontal frame member, defining a generally triangular frame, a heated body disposed generally parallel to said upright frame member and having its lower end in engagement with the apex of said frame opposite said handle, means interposed between said upright frame member and said heated body to maintain said body spaced from such frame member over the greater portion of its length, the lower end of said heated body being curved and extending forwardly and downwardly from said horizontal frame member, said heated body having a plurality of slots in the forward side of its lower end, a U-shaped cutter seated in such slots and having an edge projecting out of such slots, a plate adapted to press against the exposed edge of said cutter to clamp it with respect to said body, spaced fingers integral with said plate extending forward therefrom in continuation of the lower curved surface of said heated body, and constituting with such body's surface a guide for the tool, a rearwardly projecting pin integral with the upper edge of said plate, said heated body having a socket in its lower end for reception of the end of said pin to locate said plate, said heated body having a slot extending upwardly from its lower end in a plane generally parallel to said frame, a thin blade integral with said plate and extending rearwardly therefrom received in said body's slot, and means reacting between said frame and said blade for drawing said pin into its socket and said plate against said cutter.

9. A tire grooving tool, comprising a skeleton metallic frame having one side formed as a bar, a handle supported from said frame, a heated body disposed generally parallel to and spaced from said bar, a member upon the bar and a matching member upon the heated body, engaging along substantially a line contact, and a securing member spaced along the bar therefrom and interengageable between the bar and the heated body, to support the latter immovably in its disposition relative to the bar, a cutter supported in heat exchange relation to said heated body, said bar having apertures, including one located between the two points of the heated body's support, to retard conduction of heat therethrough, and to the handle.

WILLIAM MOSSBACK.
JOSEPH A. MENARD.